United States Patent

Tokiwa et al.

Patent Number: 5,738,788
Date of Patent: Apr. 14, 1998

[54] FILTER MATERIAL

[75] Inventors: Takashi Tokiwa; Etsuroh Nakao; Yoshiaki Kawatsu, all of Ibaraki, Japan

[73] Assignee: Japan Vilene Company Ltd., Tokyo, Japan

[21] Appl. No.: 698,222

[22] Filed: Aug. 14, 1996

Related U.S. Application Data

[63] Continuation of Ser. No. 309,586, Sep. 21, 1994, abandoned.

[30] Foreign Application Priority Data

Sep. 22, 1993 [JP] Japan ................ 5-259119

[51] Int. Cl.$^6$ ................ B01D 39/08; B01D 39/16
[52] U.S. Cl. ................ 210/507; 210/509
[58] Field of Search ................ 210/506, 640, 210/651, 654, 500.27, 504, 505, 507, 508, 509

[56] References Cited

U.S. PATENT DOCUMENTS

| | | | |
|---|---|---|---|
| 2,411,238 | 11/1946 | Zender | 210/640 |
| 4,714,647 | 12/1987 | Shipp, Jr. et al. | 428/212 |
| 4,968,430 | 11/1990 | Hildenbrand et al. | 210/640 |
| 4,981,961 | 1/1991 | Ngo | 536/112 |
| 5,032,279 | 7/1991 | Lee | 210/640 |
| 5,262,067 | 11/1993 | Wilk et al. | 210/506 |
| 5,478,470 | 12/1995 | Fukuda et al. | 210/503 |

OTHER PUBLICATIONS

Hirotsu et al., Journal of Applied Polymer Science, vol. 36, 1717–1729 (1988).

Ichimura, Journal of Polymer Science: Polymer Chemistry Edition, vol. 22, pp. 2187–2828 (1984).

Hirotsu, Journal of Polymer Science, vol. 36, pp. 1717–1729 (1988).

*Primary Examiner*—David A. Simmons
*Assistant Examiner*—Kenneth M. Jones
*Attorney, Agent, or Firm*—Sughrue, Mion, Zinn, Macpeak & Seas, PLLC

[57] ABSTRACT

A filter material comprising a base material carrying thereon polyvinyl alcohols formed by cross-linking photosensitive polyvinyl alcohols having a quaternized nitrogen-containing aromatic heterocyclic group is disclosed.

15 Claims, No Drawings

FILTER MATERIAL

This is a Continuation of application Ser. No. 08/309,586 filed Sep. 21, 1994, now abandoned.

BACKGROUND OF THE INVENTION

1. Field of the Invention

The present invention relates to a filter material, more particularly, a filter material for treating liquid, and a cartridge filter containing the above filter material.

2. Description of the Related Art

Woven and nonwoven fabrics, paper, fibers, and the like are used as a filter material for treating liquid. These filter materials, as described in, for example, Japanese Unexamined Patent Publications (Kokai) No. 60-216818 and No. 1-29711, are used in a depth type cartridge filter by being wound and laminated around a porous core, or in a pleated type cartridge filter by being pleated and then wound around a porous core. In such filter materials, it is possible to narrow the pore size so as to prevent the passage of particles such as dust and thereby enhance filtration efficiency. However, there are disadvantages in that the size of the particles which can be trapped in the filter material is limited, and if the pore size is made too small, clogging tends to occur.

To remedy the above defects, Japanese Unexamined Patent Publication (Kokai) No. 4-197409 proposes a filter material comprising functional fibers positively charged by adhering thereon a quaternary ammonium salt or the like. The filter material can adsorb negatively charged particles present in water by the electrostatic attraction of the positively charged functional fibers. Therefore, a high efficiency of trapping particles can be expected without unduly narrowing the pore size of the filter material, and further, the duration of life of the filter material can be extended. Even in this filter material, however, there is the problem that if large amounts of positively charged particles or neutral particles exist in water, the efficiency of trapping particles such as dust is reduced. Further, quaternary ammonium salts do not firmly bond to the surface of the filter material, and therefore the salts are eliminated from the filter material during use and the trapping ability is reduced.

SUMMARY OF THE INVENTION

Accordingly, an object of the invention is to provide a filter material which does not have the above defects, which can trap fine particles which are smaller than the pore size of the filter material, and which is resistant to clogging.

Another object of the present invention is to provide a cartridge filter containing such a filter material.

Other objects and effects of the present invention will be clear from the following description.

The present invention relates to a filter material comprising a base material carrying thereon polyvinyl alcohols formed by cross-linking photosensitive polyvinyl alcohols having a quaternized nitrogen-containing aromatic heterocyclic group.

The present invention also relates to a cartridge filter containing the above filter material.

DESCRIPTION OF THE PREFERRED EMBODIMENTS

The filter material of the present invention comprises (1) a base material or filter base material and (2) cross-linked polyvinyl alcohols adhered to the base material. The cross-linked polyvinyl alcohols are formed by cross-linking photosensitive polyvinyl alcohols having quaternized aromatic nitrogen-containing heterocyclic groups. There exist, on the large surface of the filter material of the present invention, quaternized aromatic nitrogen-containing heterocyclic groups which can strongly adsorb negatively charged particles and a lot of hydroxyl groups which can adsorb positively charged particles. Therefore, not only the mechanical trapping of particles by the pores of the filter material, but also the ionic adsorption of particles may be used in the filter material of the present invention. Accordingly, the filter material of the present invention can trap fine particles unless the pore size is made small. Further, the present filter material is resistant to clogging, and has a long life and excellent efficiency of trapping particles.

The photosensitive polyvinyl alcohol, i.e., the photosensitively cross-linking polyvinyl alcohol, used in the present invention contains photosensitive groups, and thus, may be cross-linked by the reaction of the photosensitive groups with light to form water-insoluble polyvinyl alcohols.

The photosensitive group is not limited, but preferably a group of the formula (I):

$$=CH[(CH_2)n-O]_m$$ 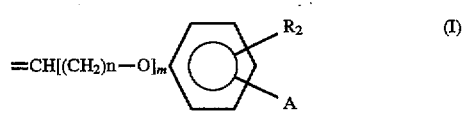 (I)

wherein A represents a group of $-CH=CH-R_1$ or $-CON-^+N$ 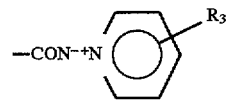

$R_1$ represents a quaternized nitrogen-containing aromatic heterocyclic group which may be substituted, $R_2$ and $R_3$ independently represent a hydrogen atom or alkoxy group having 1 to 4 carbon atoms, m is 0 or 1, and n is an integer of 1 to 6.

In the above formula (I), the group $R_1$ is preferably a 5- or 6-membered aromatic heterocyclic group which contains one or two nitrogen atoms and optionally an oxygen or sulfur atom as one or more hetero atoms, and which may be condensed with a benzene ring. As examples of the group $R_1$, there may be mentioned groups of pyridinium (e.g., 2-, 3- or 4-pyridinium); quinolinium (e.g., 2-, 4- or 8-quinolinium); isoquinolinium (e.g., 1-, 4- or 8-isoquinolinium); pyrimidinium (e.g.,2-, 4- or 5-pyrimidinium); thiazolinium (e.g., 2-, 4- or 5-thiazolinium); benzthiazolinium (e.g., 2-, 4- or 7-thiazolinium); or benzoxazolinium (e.g., 2-, 4- or 7-thiazolinium) group. The group $R_1$ is quaternized at the ring nitrogen atom substituted by, for example, an alkyl group having 1 to 4 carbon atoms which may be substituted by a sulfonic acid group. Further, the group $R_1$ may be substituted at one or more ring carbon atoms by one or more alkyl groups having 1 to 4 carbon atoms, alkoxy groups having to 4 carbon atoms, amino groups or carbamoyl groups. The groups $R_2$ and $R_3$ may independently be hydrogen or alkoxy groups such as methoxy, ethoxy, n-propoxy, or isopropoxy group. The typical examples of the photosensitive polyvinyl alcohols having quaternized nitrogen-containing aromatic heterocyclic groups are as follows:

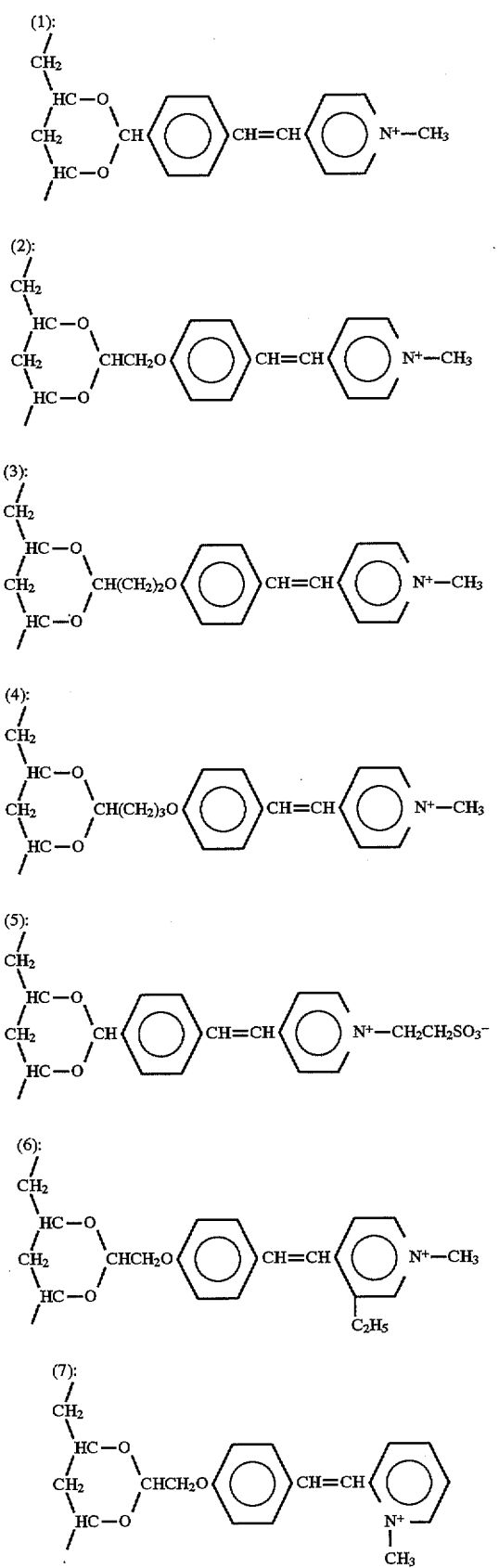
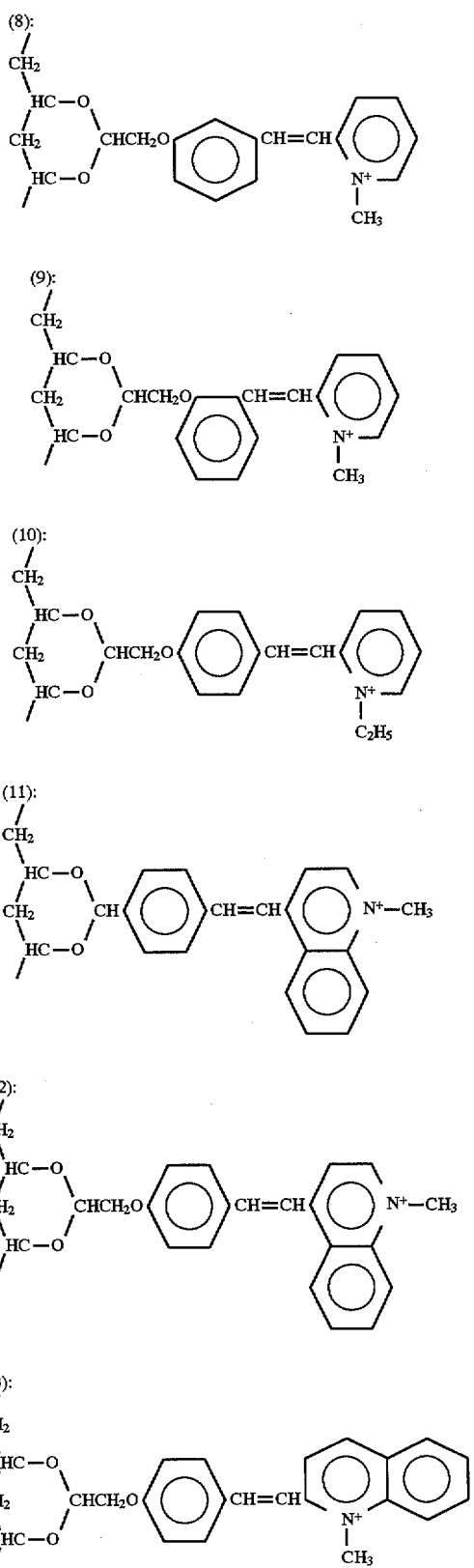

-continued (14):
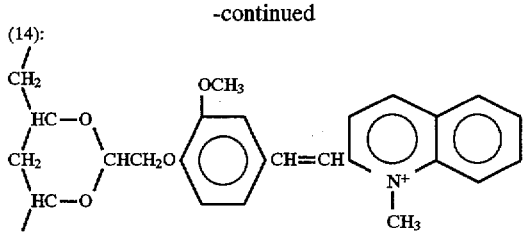

(15):
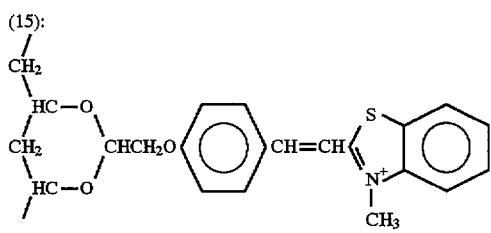

(16):
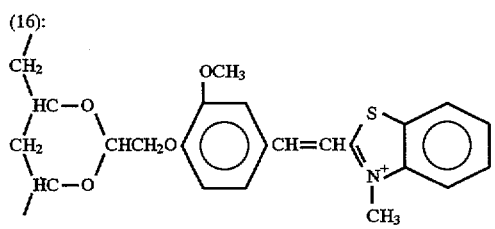

(17):
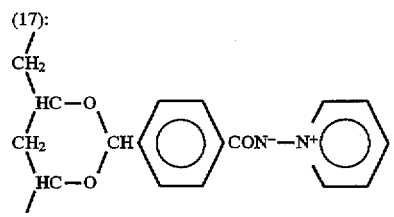

The ratio of the photosensitive groups in the above photosensitive polyvinyl alcohol is preferably 0.5 to 20 mol %, more preferably 0.5 to 10 mol %, and most preferably 1 to 5 mol %, based on a monomer unit of the polyvinyl alcohol. If the ratio of the photosensitive groups is less than 0.5 mol %, it becomes difficult to make the polyvinyl alcohol having some degrees of polymerization insoluble in water. On the other hand, if the ratio of the photosensitive groups is more than 10 mol %, the viscosity of the solution becomes high and adherence to the filter base material becomes difficult.

The ratio of the hydroxyl groups in the photosensitive polyvinyl alcohol is preferably at least 20 mol %, more particularly at least 40 mol %, most preferably at least 60 mol %, based on a monomer unit of the polyvinyl alcohol, because the function to adsorb particles by the hydroxyl groups is used. When focusing only on the ability to trap particles, it is preferable that all of the hydroxyl groups in the photosensitive polyvinyl alcohol be free hydroxyl groups other than those substituted by the photosensitive groups. However, when processability, such as windability of the filter material, is particularly required, a polyvinyl alcohol having the hydroxyl groups substituted by other functional groups. It is because the polyvinyl alcohol having too many free hydroxyl groups become hard and brittle. As the functional groups, there may be mentioned acyl groups, such as formyl, acetyl, propionyl, butyryl, or isobutyryl group. The functional groups may render the cross-linked polyvinyl alcohol soft and impart good processability.

The degree of polymerization of the photosensitive polyvinyl alcohol is preferably at least 500, more preferably at least 1500, most preferably at least 2500. If the degree of polymerization is less than 500, while depending on the ratio of the photosensitive groups, it becomes hard to make the resin insoluble in water even after cross-linked. The degree of saponification is not particularly limited, but preferably about 70 to 100.

The cross-linking reaction of the photosensitive polyvinyl alcohols proceeds, for example, as shown in the following schema (A):

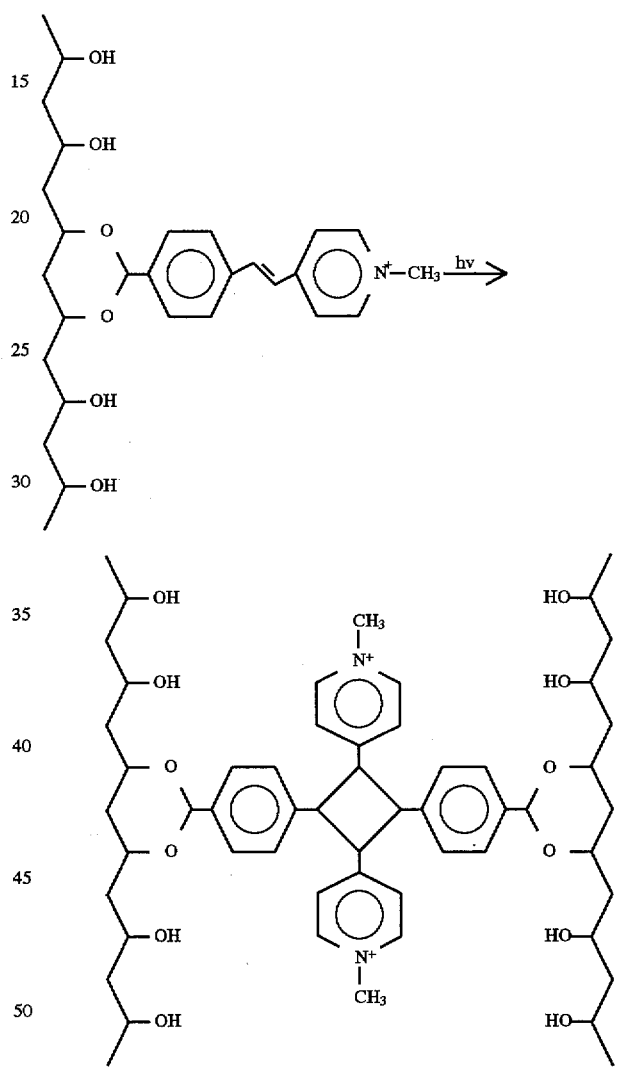

The above schema (A) shows an example where the photosensitive polyvinyl alcohols having the styrylpyridinium groups in the formula (1) as the photosensitive group are reacted. In the cross-linked polyvinyl alcohols, the pyridinium groups, that is, quaternized aromatic nitrogen-containing heterocyclic groups, remain. Therefore, the cross-linked polyvinyl alcohol has the ability to strongly adsorb negatively charged substances, and thus, can adsorb, for example, negatively charged fine particles and microorganisms whose surfaces are generally negatively charged. Further, as mentioned above, the cross-linking reaction of the photosensitive polyvinyl alcohols used in the present invention can be carried out by a small amount (for example, 1 to 5 mol %) of photosensitive groups therein to form water-insoluble resin. Therefore, a large amount of hydroxyl groups exist in the cross-linked polyvinyl alcohol, and it is possible to adsorb positively charged substances. If polyvinyl alcohols are rendered water-insoluble by other cross-linking methods, a reaction of the hydroxyl groups is substantially used. Therefore, it is difficult to control the number of the hydroxyl groups. Further, a lot of the hydroxyl groups are lost, if the cross-linking reaction is carried out to the extent to impart water-insolubility.

The filter material of the present invention carries thereon cross-linked polyvinyl alcohols formed by cross-linking the above adhered photosensitive polyvinyl alcohols. Therefore, quaternized aromatic nitrogen-containing heterocyclic groups and hydroxyl groups are distributed throughout the surface of the filter material having a large surface area, and the chance of contact with particles to be trapped is increased. Accordingly, it is possible to efficiently adsorb both positively and negatively charged fine particles. Further, the polyvinyl alcohol is made insoluble by the cross-linking reaction, and thus, not dissolved into the solution to be treated. Therefore, there is no possibility to pollute the environment and the filter material may be safely used.

The cross-linking polyvinyl alcohols may be adhered to the filter base material by any conventional methods. For example, the photosensitively cross-linking polyvinyl alcohols are dissolved in water, applying, for example, impregnating or coating, the resulting aqueous solution on the filter base material to adhere it, and then cross-linking by irradiation of light. For the irradiation, any light sources, such as sunlight, fluorescent lamps, mercury lamps, xenon lamps may be used. While the time for irradiation varies dependently on the thickness of the adhered cross-linking polyvinyl alcohol membrane, it is possible to cause the cross-linking reaction by irradiating ultraviolet rays for 0.5 to 5 minutes, in the case of a mercury lamp.

The amount of the cross-linked polyvinyl alcohols adhered is preferably 0.05 to 5% by weight, more preferably 0.1 to 1% by weight, based on the weight of the filter base material. If the amount of the polyvinyl alcohols adhered is less than 0.05% by weight, an adsorption force for fine particles is not sufficient and the trapping ability is reduced. If the amount of the polyvinyl alcohols adhered is more than 5% by weight, the filter material easily clogs.

The filter base material or the base material on which the cross-linked polyvinyl alcohols of the present invention are adhered and formed is not limited, but any conventional base materials, for example, fibrous material such as woven, knitted or nonwoven fabrics, paper, yarn, nets, or the like may be used singly or in combination. It is preferable to use a relatively dense fibrous material, for example, nonwoven fabric, more preferably a melt blown nonwoven fabric. By adhering cross-linked polyvinyl alcohols on the melt blown nonwoven fabric, it becomes possible to trap fine particles which was difficult to trap by the conventional filter material unless the water permeation resistance or the filter life was sacrificed. Depending on the application, however, a coarse mesh base material may also be used.

The filter material of the present invention has the ability to adsorb microorganisms. Therefore, the filter material may be used, for example, in a filter apparatus for removing microorganisms or in a water-purifying apparatus using the purifying abilities of the adsorbed microorganisms.

Further, the hydroxy groups in the cross-linked polyvinyl alcohols can form chelate compounds with ions present in liquid to be treated. Thus, ions may be removed by the filter material of the present invention.

The filter material of the present invention carrying thereon the cross-linked polyvinyl alcohols may be used in any conventional filter apparatuses, particularly those for treating liquid. For example, the present filter material may be used preferably in a depth or pleated type cartridge filter. In the case of a cartridge filter, the present filter material is wound as at least one layer laminated over the outer surface of a porous core cylinder. It is preferable to use the present filter material as a main filter layer which has the smallest pore size in the layers of a cartridge filter wherein plural filter layers having different pore sizes are laminated, because particles such as dust in liquid to be treated can be efficiently removed. Of course, it is possible to use the the present filter material as the main filter layer which is located at the outermost or innermost layer.

EXAMPLES

The present invention now will be further illustrated by, but is by no means limited to, the following Examples.

Example 1

As the filter base materials No. 2 and No. 3, and the filter materials No. 1 and No.4 to No. 8, polypropylene melt-blown nonwoven fabrics (weight per unit area=80 g/m$^2$) having different mean pore sizes as shown in Table 1 were prepared.

TABLE 1

| Filter (Base) material No. | 1 | 2 | 3 | 4 | 5 | 6 | 7 | 8 |
|---|---|---|---|---|---|---|---|---|
| Mean pore size (μm) | 70 | 3 | 5 | 10 | 17 | 24 | 31 | 62 |
| Winding length (cm) | 120 | 120 | 60 | 60 | 40 | 40 | 40 | 30 |

An aqueous solution containing 0.2% by weight of polyvinyl alcohol was prepared by dissolving in water polyvinyl alcohols containing 1.3 mol % (with respect to 1 monomer unit of the polyvinyl alcohol) of photosensitive styrylpyridinium groups shown in the above formula (1), having a polymerization degree of 1,700 and a saponification degree of 88. The resulting aqueous solution was applied on the melt-blown nonwoven fabrics of filter base material Nos. 2 and 3 of Table 1 so that a solid content of the solution was adhered in an amount of 0.2% by weight based on the weight of the nonwoven fabric. Then, a high pressure mercury lamp was used to irradiate ultraviolet rays for 1 minute to photosensitively cross-link the polyvinyl alcohol and the product was dried, thereby obtaining filter material Nos. 2 and 3 carrying thereon cross-linked polyvinyl alcohol.

The filter materials Nos. 1 and 4 to 8 which did not carry the cross-linked polyvinyl alcohols adhered thereon and the filter base material Nos. 2 and 3 carrying the adhered resin thereon were wound and laminated on a porous core in the sequence from No. 1 to No. 8 to prepare a cartridge filter having an inner diameter of 3 cm, an outer diameter of 6.4 cm, and a length of 25 cm.

Example 2

The procedure described in Example 1 was repeated, except that polyvinyl alcohols containing 1.4 mol % (with respect to 1 monomer unit of the polyvinyl alcohol) of photosensitive groups shown in the above formula (5), having a polymerization degree of 1,800 and a saponification degree of 100 were used, instead of polyvinyl alcohols containing 1.3 mol % of photosensitive styrylpyridinium groups shown in the above formula (1), having a polymerization degree of 1,700 and a saponification degree of 88.

A cartridge filter having the same size was prepared as in Example 1.

Example 3

The procedure described in Example 1 was repeated, except that polyvinyl alcohols containing 1.3 mol % (with respect to 1 monomer unit of the polyvinyl alcohol) of photosensitive groups shown in the above formula (11), having a polymerization degree of 1,700 and a saponification degree of 88 were used, instead of polyvinyl alcohols containing 1.3 mol % of photosensitive styrylpyridinium groups shown in the above formula (1), having a polymerization degree of 1,700 and a saponification degree of 88.

A cartridge filter having the same size was prepared as in Example 1.

Comparative Example 1

The procedure described in Example 1 was repeated, except that the base materials No. 2 and No.3 before treated with the aqueous solution containing polyvinyl alcohol were used to prepare the cartridge filter having the same size as in Example 1.

Comparative Example 2

The procedure described in Example 1 was repeated, except that three of the filter material No. 2 (having the smallest mean pore size) before treated with the aqueous solution containing polyvinyl alcohol were used, the base material No.3 before treated with the aqueous solution containing polyvinyl alcohol were used, and the filter material Nos. 7 and 8 (having the large mean pore sizes) were not used. The filter materials were wound on the porous core in the sequence of the filter materials Nos. 1, 2, 2, 2, 3, 4, 5, and 6 from the innermost to the outermost to prepare a cartridge filter having the same size as in Example 1.

Comparative Example 3

A 50% methanol solution of 3-(trimethoxysilyl) propyloctadecyldimethyl ammonium chloride was dissolved in ethanol to obtain a 0.2% by weight solution. The resulting solution was applied on the melt blown nonwoven fabrics of the filter base materials Nos. 2 and 3 in Table 1 so that a solid content of the solution was adhered in an amount of 0.2 by weight based on the weight of the nonwoven fabric. The product was dried to obtain filter material Nos. 2 and 3 carrying thereon the adhered resins having positive charge.

The filter materials Nos. 1 and 4 to 8 which did not carry the resins adhered thereon and the filter base material Nos. 2 and 3 carrying the adhered resin having positive charge thereon were wound and laminated on a porous core in the sequence from No. 1 to No. 8 to prepare a cartridge filter having the same size as in Example 1.

EXPERIMENTS

Experiment 1

The water permeation resistance, the filter life, and the trapping efficiency of the resulting cartridge filters were examined by the following methods. The water permeation resistance and filter life are shown in Table 2 and the trapping efficiency is shown in Table 3.

(1) Water Permeation Resistance

The initial pressure loss when 25 liter/minute of water was passed through the cartridge filter was measured and shown as the water permeation resistance.

(2) Filter Life

A test liquid containing dust for industrial testing No. 11 specified in JIS (Japanese Industrial Standard) dispersed in water in a concentration of 10 ppm was uniformly agitated and passed through the cartridge filter at a flow rate of 25 liters/minute. The pressure loss was measured with time. The total amount of water passed during the term until the difference of the pressure with the initial pressure reached 2.0 kg/cm$^2$ was measured. The resulting value was shown as the filter life.

(3) Trapping Efficiency

A test liquid containing dust for industrial testing No. 11 specified in JIS (Japanese Industrial Standard) dispersed in water in a concentration of 10 ppm was uniformly agitated and passed through the cartridge filter at a flow rate of 25 liters/minute. After 1 minute from the beginning of the liquid-passing, the filtrate was sampled. The number of particles contained in the sampled filtrate and the test liquid before filtration were measured for each particle size using a particle size distribution measuring apparatus, and the trapping efficiency at each particle size was determined by the following equation:

$$\text{Trapping efficiency (\%)} = (A-B) \times 100/A$$

wherein A is the number of particles contained in the test liquid before filtration and B is the number of particles contained in the sampled filtrate. The dusts in the test liquid of Experiment 1 were negatively charged.

The results of the above experiments are shown in Tables 2 and 3

TABLE 2

|  | Permeation resistance (kg/cm$^2$) | Filter life (liters) |
|---|---|---|
| Example 1 | 1.33 | 932 |
| Example 2 | 1.30 | 926 |
| Example 3 | 1.31 | 935 |
| Comparative Example 1 | 1.29 | 948 |
| Comparative Example 2 | 1.86 | 180 |
| Comparative Example 3 | 1.35 | 904 |

TABLE 3

| Particle size (μm) | 0.4–0.5 | 0.5–0.6 | 0.6–0.7 |
|---|---|---|---|
| Example 1 | 99.71 | 99.85 | 99.90 |
| Example 2 | 99.52 | 99.72 | 99.85 |
| Example 3 | 99.67 | 99.80 | 99.88 |
| Comparative Example 1 | 78.14 | 90.90 | 97.63 |
| Comparative Example 2 | 97.35 | 98.21 | 98.93 |
| Comparative Example 3 | 96.36 | 97.54 | 98.06 |

| Particle size (μm) | 0.7–0.8 | 0.8–0.9 | 0.9–1.0 |
|---|---|---|---|
| Example 1 | 99.95 | 99.97 | 100.00 |
| Example 2 | 99.91 | 99.96 | 100.00 |
| Example 3 | 99.93 | 99.98 | 100.00 |
| Comparative Example 1 | 98.97 | 99.68 | 99.80 |
| Comparative Example 2 | 99.45 | 99.90 | 100.00 |
| Comparative Example 3 | 99.26 | 99.79 | 99.97 |

Experiment 2

The procedure described in Experiment 1 was repeated, except that a test liquid containing white fused alumina No.

1 (containing 99% $Al_2O_3$) dispersed in a sodium citrate-hydrochloride buffer (pH 2.8) in a concentration of 10 ppm was used instead of the test liquid used in Experiment 1. The trapping efficiency and the filter life were determined as in Experiment 1. The results are shown in Tables 4 and 5, respectively. The dusts in the test liquid of Experiment 2 were positively charged.

TABLE 4

|  | Permeation resistance ($kg/cm^2$) | Filter life (liters) |
| --- | --- | --- |
| Example 1 | 1.33 | 882 |
| Example 2 | 1.30 | 890 |
| Example 3 | 1.31 | 876 |
| Comparative Example 1 | 1.29 | 900 |
| Comparative Example 2 | 1.86 | 195 |
| Comparative Example 3 | 1.35 | 850 |

TABLE 5

| Particle size (μm) | 0.4–0.5 | 0.5–0.6 | 0.6–0.7 |
| --- | --- | --- | --- |
| Example 1 | 98.45 | 98.89 | 99.08 |
| Example 2 | 97.66 | 98.51 | 99.12 |
| Example 3 | 98.31 | 98.76 | 99.01 |
| Comparative Example 1 | 68.07 | 93.05 | 95.71 |
| Comparative Example 2 | 97.43 | 98.42 | 99.00 |
| Comparative Example 3 | 66.95 | 92.94 | 95.10 |
| Particle size (μm) | 0.7–0.8 | 0.8–0.9 | 0.9–1.0 |
| Example 1 | 99.38 | 99.82 | 100.00 |
| Example 2 | 99.05 | 99.91 | 100.00 |
| Example 3 | 99.37 | 99.92 | 100.00 |
| Comparative Example 1 | 97.63 | 99.68 | 99.93 |
| Comparative Example 2 | 99.34 | 99.91 | 100.00 |
| Comparative Example 3 | 96.36 | 99.67 | 99.92 |

It is clear from the Tables 2 to 5 that the cartridge filters of Examples 1 to 3 were able to efficiently trap dusts having a particle size of 0.4 to 0.5 μm which is far less than the smallest mean pore size (i.e., 3 μm) in the filter material layers used in Examples 1 to 3. Further, the cartridge filters of Examples 1 to 3 exhibited high trapping efficiency for both of the test liquids containing positively and negatively charged dusts in Experiments 1 and 2. As shown in Comparative Example 1, the cartridge filter prepared only from the filter materials without the treatment with a resin exhibited a low trapping efficiency for fine particles, particularly a considerably low trapping efficiency for fine particles having a particle size of 0.4 to 0.5 μm. Thus, the cartridge filter in Comparative Example 1 cannot sufficiently trap fine particles. As shown in Comparative Example 2, the cartridge filter wherein all the filter materials were not treated with a resin and a lot of the filter materials having small mean pore sizes were contained exhibited the trapping efficiency similar to that of the cartridge filter according to the present invention. However, the water permeation resistance was high, clogging easily occurred, and the filter life was remarkably short. As shown in Comparative Example 3, the cartridge filter containing the positively charged filter materials obtained by the resin treatment exhibited a trapping ability similar to that of the cartridge filter according to the present invention, for the test liquid containing the negatively charged dusts used in Experiment 1. In Experiment 2, however, the trapping efficiency for the positively charged fine particles of a size of 0.4 to 0.5 μm was lower than even that of the cartridge filter of Comparative Example 1 wherein no treatment with a resin was carried out. It is manifest that the treatment with the resin in Comparative Example 3 brings about no effect for positively charged fine particles.

As above, the present invention was explained with reference to particular embodiments, but modifications and improvements obvious to those skilled in the art are included in the scope of the present invention.

We claim:

1. A porous filter material for liquid/solid separation consisting of:
   a porous base material which:
   (i) is covered thereon with crosslinked polyvinyl alcohols formed by cross-linking photosensitive polyvinyl alcohols which have as photosensitive groups a quaternized nitrogen-containing aromatic heterocyclic group,
   (ii) is selected from the group consisting of woven fabric, knitted fabric, nonwoven fabric, paper, yarn and net, and
   (iii) has a mean pore size of at least about 3μ.

2. A filter material according to claim 1, wherein said photosensitive polyvinyl alcohol contains a photosensitive group of the formula (I):

wherein A represents a group of —CH=CH—$R_1$ or

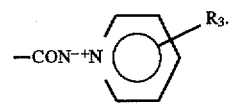

$R_1$ represents a quaternized nitrogen-containing aromatic heterocyclic group which may be substituted, $R_2$ and $R_3$ independently represent a hydrogen atom or alkoxy group having 1 to 4 carbon atoms, m is o or 1, and n is an integer of 1 to 6.

3. A filter material according to claim 2, wherein $R_1$ represents a 5- or 6-membered aromatic heterocyclic group.

4. A filter material according to claim 1, wherein a ratio of the photosensitive groups in the photosensitive polyvinyl alcohol is 0.5 to 20 mol %, based on a monomer unit of the polyvinyl alcohol.

5. A filter material according to claim 1, wherein the cross-linked polyvinyl alcohol carried on the base material contains hydroxyl groups.

6. A filter material according to claim 1, wherein a ratio of hydroxyl groups in the photosensitive polyvinyl alcohol is at least 20 mol %, based on a monomer unit of the polyvinyl alcohol.

7. A filter material according to claim 1, wherein some of the hydroxyl groups contained in the cross-linked polyvinyl alcohol carried on the base material contain an acyl group as a substituent.

8. A filter material according to claim 1, wherein the base material is nonwoven fabric.

9. A filter material according to claim 8, wherein the nonwoven fabric is melt-blown nonwoven fabric.

10. A cartridge filter comprising a porous core material and at least one filter layer carried on the porous core material, said filter layer consisting of:
    a porous base material which:
    (i) is covered thereon with crosslinked polyvinyl alcohols formed by cross-linking photosensitive polyvinyl alcohols which have as photosensitive groups a quaternized nitrogen-containing aromatic heterocyclic group,
(ii) is selected from the group consisting of woven fabric, knitted fabric, nonwoven fabric, paper, yarn and net, and
(iii) the mean pore size of at least about 3µ.

11. A cartridge filter according to claim 10, wherein the filter layer is used in a layer of a filter material having a smallest mean pore size.

12. A cartridge filter according to claim 11, wherein the layer of the filter material having a smallest mean pore size is an innermost layer of the cartridge filter.

13. A filter material according to claim 1, wherein the cross-linked polyvinyl alcohols adhered to the base material are present in an amount of 0.05 to 5% by weight, based on the weight of the filter material.

14. A filter material according to claim 1, wherein the cross-linked polyvinyl alcohols adhered to the base material are present in an amount of 0.1 to 1% by weight, based on the weight of the filter material.

15. A porous filter material as in claim 1, wherein the porous base material has a trapping ability for trapping by ionic adsorption particles which are smaller than the pore size.

* * * * *